United States Patent
Dhong et al.

[11] Patent Number: 6,138,208
[45] Date of Patent: Oct. 24, 2000

[54] MULTIPLE LEVEL CACHE MEMORY WITH OVERLAPPED L1 AND L2 MEMORY ACCESS

[75] Inventors: Sang Hoo Dhong; Harm Peter Hofstee, both of Austin, Tex.; David Meltzer, Wappingers Falls; Joel Abraham Silberman, Somers, both of N.Y.

[73] Assignee: International Business Machines Corporation, Armonk, N.Y.

[21] Appl. No.: 09/059,000

[22] Filed: Apr. 13, 1998

[51] Int. Cl.[7] ...................................................... G06F 12/08
[52] U.S. Cl. ........................... 711/122; 711/117; 711/118; 711/119; 711/150; 711/3
[58] Field of Search ................................. 711/3, 117, 118, 711/119, 120, 122, 123, 125, 126, 150, 138

[56] References Cited

U.S. PATENT DOCUMENTS

| | | | |
|---|---|---|---|
| 4,464,712 | 8/1984 | Fletcher | 711/122 |
| 5,155,828 | 10/1992 | Fetra et al. | 711/122 |
| 5,577,227 | 11/1996 | Finnell et al. | 711/122 |
| 5,649,154 | 7/1997 | Kumar et al. | 711/122 |
| 5,778,422 | 7/1998 | Genduso et al. | 711/117 |
| 5,826,052 | 10/1998 | Stiles et al. | 712/205 |

FOREIGN PATENT DOCUMENTS

| | | |
|---|---|---|
| 06012323 | 1/1994 | Japan. |
| 06187238 | 7/1994 | Japan. |

*Primary Examiner*—Do Hyun Yoo
*Assistant Examiner*—Than Nguyen
*Attorney, Agent, or Firm*—Casimer K. Salys; Felsman, Bradley, Vaden, Gunter & Dillon, LLP

[57] ABSTRACT

A method of providing simultaneous, or overlapped, access to multiple cache levels to reduce the latency penalty for a higher level cache miss. A request for a value (data or instruction) is issued by the processor, and is forwarded to the lower level of the cache before determining whether a cache miss of the value has occurred at the higher level of the cache. In the embodiment wherein the lower level is an L2 cache, the L2 cache may supply the value directly to the processor. Address decoders are operated in parallel at the higher level of the cache to satisfy a plurality of simultaneous memory requests. One of the addresses (selected by priority logic based on hit/miss information from the higher level of the cache) is gated by a multiplexer to a plurality of memory array word line drivers of the lower level of the cache. Some bits in the address which do not require virtual-to-real translation can be immediately decoded.

11 Claims, 3 Drawing Sheets

MULTIPLE LEVEL CACHE MEMORY WITH OVERLAPPED L1 AND L2 MEMORY ACCESS

BACKGROUND OF THE INVENTION

1. Field of the Invention

The present invention generally relates to computer systems, and more particularly to an improved method of accessing a cache memory of a processing unit, wherein the cache has a multi-level architecture, to reduce memory access latency.

2. Description of Related Art

A typical structure for a conventional computer system includes one or more processing units connected to a system memory device (random access memory or RAM) and to various peripheral, or input/output (I/O), devices such as a display monitor, a keyboard, a graphical pointer (mouse), and a permanent storage device (hard disk). The system memory device is used by a processing unit in carrying out program instructions, and stores those instructions as well as data values fed to or generated by the programs. A processing unit communicates with the peripheral devices by various means, including a generalized interconnect or bus, or direct memory-access channels. A computer system may have many additional components, such as serial and parallel ports for connection to, e.g., modems, printers, and network adapters. Other components might further be used in conjunction with the foregoing; for example, a display adapter might be used to control a video display monitor, a memory controller can be used to access the system memory, etc.

A conventional processing unit includes a processor core having various execution units and registers, as well as branch and dispatch units which forward instructions to the appropriate execution units. Caches are commonly provided for both instructions and data, to temporarily store values that might be repeatedly accessed by a processor, in order to speed up processing by avoiding the longer step of loading the values from system memory (RAM). These caches are referred to as "on-board" when they are integrally packaged with the processor core on a single integrated chip. Each cache is associated with a cache controller or bus interface unit that manages the transfer of values between the processor core and the cache memory.

A processing unit can include additional caches, such as a level 2 (L2) cache which supports the on-board (level 1) caches. In other words, the L2 cache acts as an intermediary between system memory and the on-board caches, and can store a much larger amount of information (both instructions and data) than the on-board caches can, but at a longer access penalty. Multi-level cache hierarchies can be provided where there are many levels of interconnected caches.

A typical system architecture is shown in FIG. 1, and is exemplary of the PowerPC™ processor marketed by International Business Machines Corporation. Computer system 10 includes a processing unit 12a, various I/O devices 14, RAM 16, and firmware 18 whose primary purpose is to seek out and load an operating system from one of the peripherals whenever the computer is first turned on. Processing unit 12a communicates with the peripheral devices using a system bus 20 (a local peripheral bus (e.g., PCI) can be used in conjunction with the system bus). Processing unit 12a includes a processor core 22, and an instruction cache 24 and a data cache 26, which are implemented using high speed memory devices, and are integrally packaged with the processor core on a single integrated chip 28. Cache 30 (L2) supports caches 24 and 26 via a processor bus 32. For example, cache 30 may be a chip having a storage capacity of 256 or 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. More than one processor may be provided, as indicated by processing unit 12b.

An exemplary cache line (block) includes an address tag field, a state bit field, an inclusivity bit field, and a value field for storing the actual instruction or data. The state bit field and inclusivity bit fields are used to maintain cache coherency in a multi-processor computer system (indicating the validity of the value stored in the cache). The address tag is a subset of the full address of the corresponding memory block. A compare match of an incoming address with one of the tags within the address tag field indicates a cache "hit." The collection of all of the address tags in a cache is referred to as a directory (and sometimes includes the state bit and inclusivity bit fields), and the collection of all of the value fields is the cache entry array.

One can think of computer system performance as having several components. The first is the performance of the processor as if it had a perfect cache memory, that is, as if the processor core were always able to satisfy memory requests out of its first cache level, with no memory access latency. This mode of operation gives the highest performance, of course, but it is not realistic. In a multi-level cache architecture, the next contribution to the system performance is the mode of operation wherein an access request "misses" at the first level of the cache memory, but retrieves the requested value from the second level of cache memory. This component depends on the number of additional cycles required to access the second level of memory, and is inversely proportional to the frequency with which first level cache misses occur. In computers today, an access to the second level of memory is initiated only after it is determined that a request missed at the first level. As a result, the full access time of the second level cache appears as a performance penalty.

Terms similar to the one representing the performance degradation due to misses at the first cache level can be included in the model of system performance for misses at all levels of the memory hierarchy, to refine the estimate of system performance. It would, therefore, clearly be desirable to reduce the number of additional cycles required to fetch data from higher levels of memory, in order to improve overall system performance. It would be further advantageous if the improvement could be achieved with relatively little hardware expense, and without excessive power requirements.

SUMMARY OF THE INVENTION

It is therefore one object of the present invention to provide an improved cache memory for a data processing system.

It is another object of the present invention to provide such an improved cache memory having at least two cache levels, and having reduced memory access latency associated with first level cache misses which are satisfied by the second (or lower) cache level.

It is yet another object of the present invention to provide such a multi-level cache having an architecture which is easily adapted from existing hardware designs to minimize expense and design considerations.

The foregoing objects are achieved in a method of providing data from a cache to a processor of a computer system, generally comprising the steps of loading a value into a lower level of the cache (e.g., L2), issuing a request from the processor that the value be supplied by a higher level of the cache (e.g., L1), determining that a cache miss of the value has occurred at the higher level of the cache, forwarding the request to the lower level of the cache during said determining step, and supplying the value from the lower level of the cache. In the embodiment wherein the lower level is an L2 cache, the L2 cache may supply the value directly to the processor. Several decoders may be used to decode addresses related to particular locations in a system memory device of the computer system; the decoders may be operated in parallel at the higher level of the cache to satisfy a plurality of simultaneous memory requests. One of the addresses (selected by priority logic based on hit/miss information from the higher level of the cache) is gated by a multiplexer to a plurality of memory array word line drivers of the lower level of the cache. Some bits in the address which do not require virtual-to-real translation can be immediately decoded. Other bits can be translated prior to completion of said determining step. This embodiment reduces the latency penalty with little hardware expense.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
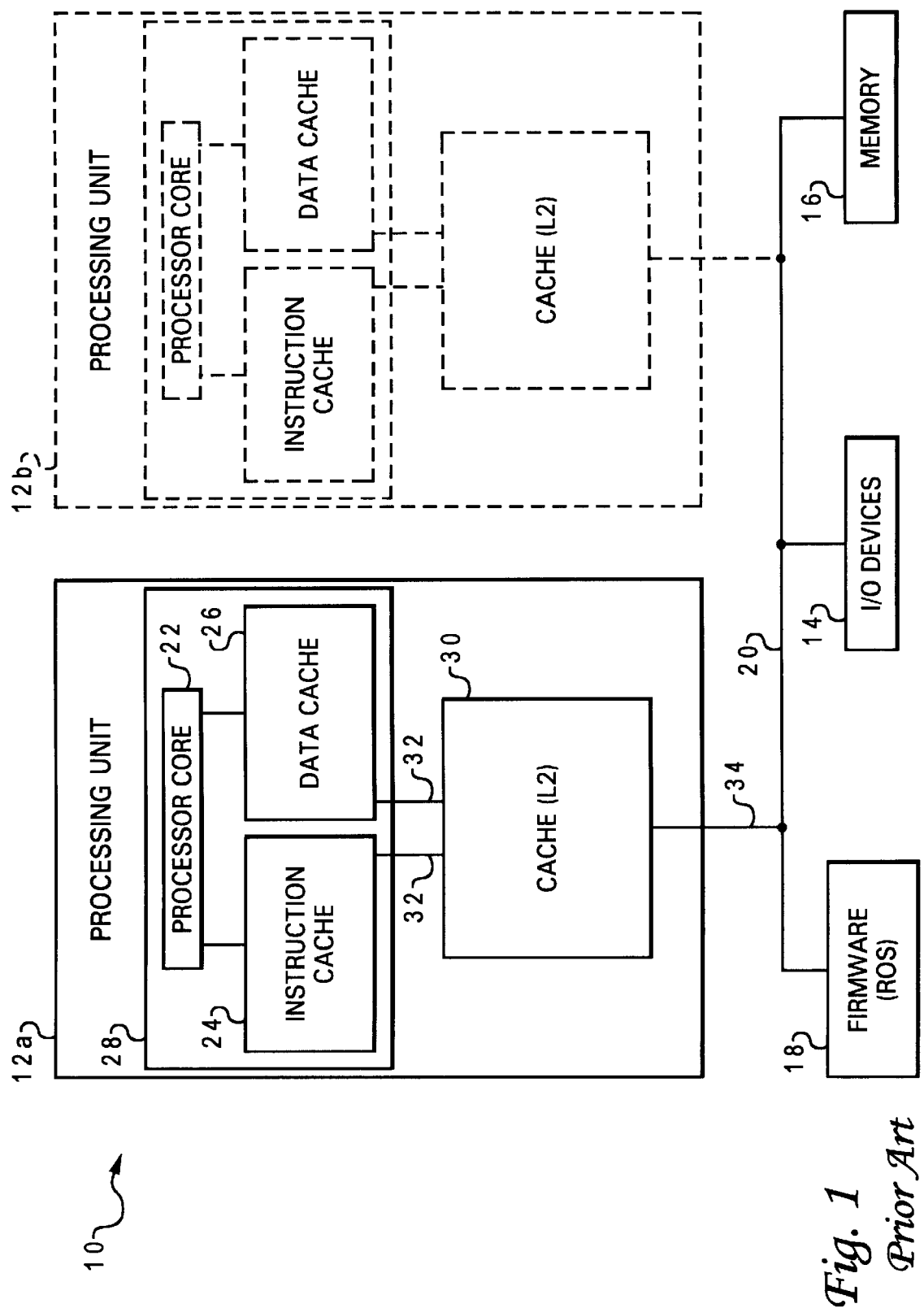
FIG. 1 is a block diagram of a prior-art multi-processor computer system.
Figure 2:
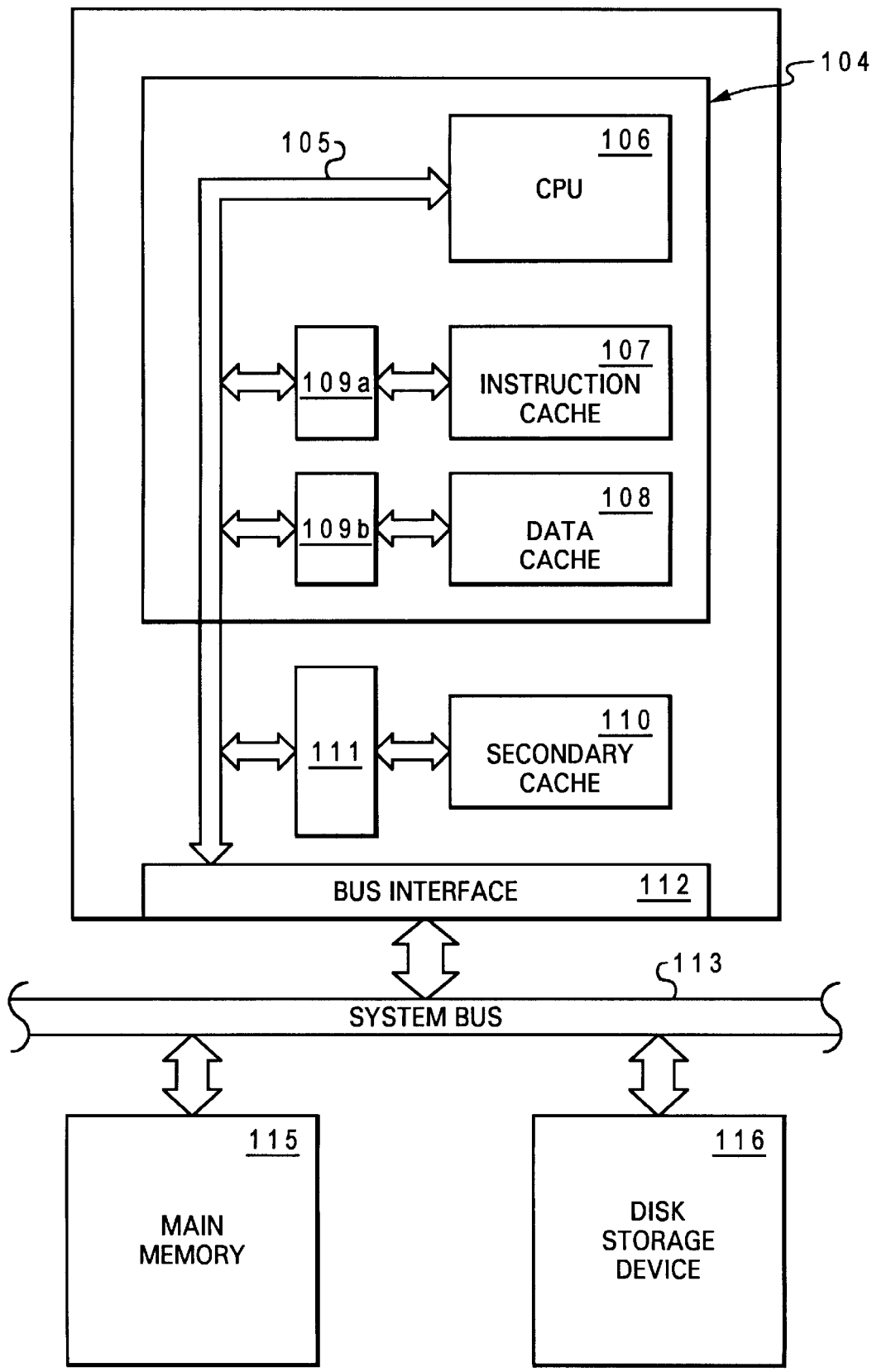
FIG. 2 is a block diagram of a data processing system having a cache memory according to one embodiment of the present invention.

With reference now to the figures, and in particular with reference to FIG. 2, there is illustrated a block diagram of a data processing system in which a cache memory may be incorporated according to one embodiment of the invention. In FIG. 2, only a single processor 104 is shown; however, the features of the present invention are also useful in a multi-processor system. Processor 104, having a CPU 106 which may be of a superscalar RISC type, is constructed as a single-chip device comprising on-chip instruction cache 107 and data cache 108. Both caches 107, 108 are connected to CPU 106 by separate paths within a local bus structure. Instruction cache 107 is connected to local bus 105 via cache controller 109a, while data cache 108 is connected to local bus 105 via cache controller 109b. A secondary cache 110 is also connected to local bus 105 via cache controller 111. Secondary cache 110 is much larger than either instruction cache 107 or data cache 108, and access to secondary cache 110 is also somewhat slower than to either instruction cache 107 or data cache 108. CPU 106 is also connected to system bus 113 via bus interface 112 in which timing and control translations between local bus 105 and system bus 113 are taking place. In addition, a main memory 115 and a disk storage device 116 are coupled to system bus 113. Other peripheral devices can be connected to system bus 113 using one or more intervening buses, such as a Peripheral Component Interconnect (PCI) bus.

The memory hierarchy is from the fastest to the slowest, from the smallest to the largest, and from the most expensive per bit to the least expensive per bit, in progression from caches 107, 108 to secondary cache 110, to main memory 115, and to disk storage device 116. Main memory 115 contains a subset of what is in disk storage device 116, secondary cache 110 contains a subset of what is in main memory 115, and each of caches 107, 108 contains a subset of what is in secondary cache 110. CPU 106 can access caches 107, 108 within a processor cycle, while it may take several processor cycles to access secondary cache 110. If a cache miss occurs in caches 107, 108, and secondary cache 110, then main memory 115 is accessed to perform a cache linefill operation-replacing a cache line with an equivalent bit portion from main memory 115 which contains the addressed data. This cache linefill operation must be performed in order to satisfy the attempted cache access for which a cache miss occurred. If main memory 115 does not contain the location for which the cache linefill operation is attempted, then a page containing this data is obtained from disk storage device 116 such that the cache linefill operation can be completed. The time for acquiring a page from disk storage device 116 and writing it to main memory 115 may require many thousands of processor cycles, during which CPU 106 may be switched to do another task or stalled in order to wait for the data to satisfy the request.

The present invention reduces the time penalty for going to the next level in the memory hierarchy to satisfy a request that missed a higher cache level. The reduction in memory access latency is achieved by overlapping, preferably as much as possible, the access to the first level in the hierarchy with an access to the second level. By overlapping the two accesses, any penalty for a first-level cache miss is just the difference in cycles that accessing the second level requires over that of accessing the first.

Figure 3:
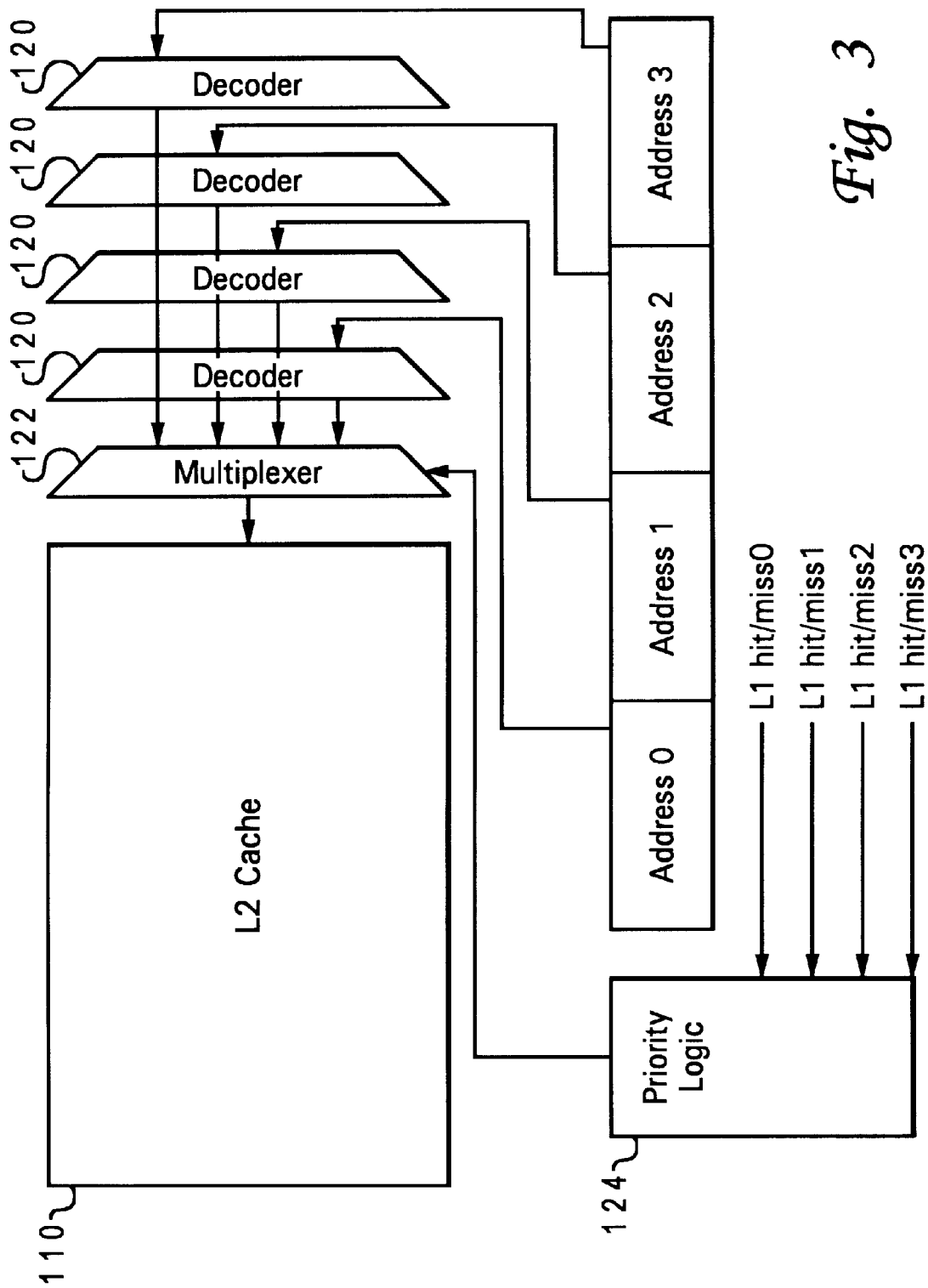
FIG. 3 is a block diagram of the cache memory of FIG. 2, depicting in further detail the decoding of addresses (or partial addresses) at a lower cache memory level (L2), to provide a parallel access with the higher cache memory level (L1).

The two accesses to L1 and L2 caches can be efficiently overlapped by decoding an address related to a particular location in the memory, as depicted in FIG. 3. Many decoders 120 can be used in parallel at the higher memory level as needed to satisfy the maximum number of potential simultaneous memory requests. The addresses are decoded as fully as the available information allows without actually accessing the memory array. Bits of the address that do not require virtual-to-real translation, for example, can be decoded immediately. Bits of the address that are available after translation in, for instance, the translation lookaside buffer (TLB), can be decoded as soon as they are available—usually before the cache hit or miss signal is determined. Ideally, the addresses are decoded up to the second level cache memory array word line drivers. This decoding can be accomplished fully in parallel with the access of the first level cache. When it is determined that a first level cache miss occurred, the appropriate decoded address can then be gated to the word line drivers using a multiplexer 122 to access the requested data in the second level cache. Multiplexer 122 is controlled by priority logic 124 which receives the L1 hit/miss information for each respective addresses. The cache level miss penalty is thus reduced by the latency of the decoders in the second level cache.

This embodiment for achieving the access overlap is attractive because it reduces the latency penalty with little hardware expense. Decoders generally consume little power since they ultimately switch on only one of a large number of signals. Aside from the duplication of decoders needed to accommodate several potential address sources, the invention only requires a multiplexer to gate the appropriate decoded signal to the word line driver.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention can be expanded to more than two cache levels, by reducing memory access latency when a second-level cache miss is satisfied by a third cache level. It is therefore contemplated that such modifications can be made without departing from the spirit or scope of the present invention as defined in the appended claims.

What is claimed is:

1. A method of providing data from a cache to a processor of a computer system, comprising the steps of:

loading a value into a lower level of the cache;

issuing a request from the processor that the value be supplied by a higher level of the cache;

in response to said issuing step, determining that a cache miss of the value has occurred at the higher level of the cache;

forwarding the request to the lower level of the cache during said determining step, including the step of decoding an address related to a particular location of the value in a system memory device of the computer system; and in response to said determining step, supplying the value from the lower level of the cache.

2. The method of claim 1 wherein the value is supplied from the lower level of the cache directly to the processor.

3. The method of claim 1 wherein said decoding step includes the step of operating a plurality of decoders in parallel at the higher level of the cache to satisfy a plurality of simultaneous memory requests.

4. The method of claim 1 wherein said supplying step includes the step of gating the address to a plurality of memory array word line drivers of the lower level of the cache.

5. The method of claim 1 wherein said decoding step includes the step of immediately decoding a plurality of bits of the address that do not require virtual-to-real translation.

6. The method of claim 5 wherein said decoding step includes the step of translating another plurality of bits of the address prior to completion of said determining step.

7. A cache for providing values to a processor of a computer system, the cache comprising:

a higher cache level;

a lower cache level; and means for reducing memory access latency when a cache miss of a value has occurred at said higher cache level and the value is supplied from said lower cache level, said reducing means providing an overlap of a first access of said higher cache level and a second access of said lower cache level, by forwarding a request of the value from the processor to said lower cache level while said first cache level determines whether a cache miss has occurred, the request being forwarded by decoding an address related to a particular location of the value in a system memory device of the computer system.

8. The cache of claim 7 wherein:

said higher cache level is a first cache level connected to the processor; and said lower cache level is a second cache level connected to said first cache level.

9. The cache of claim 7 wherein said second cache level is further connected to a third cache level.

10. The cache of claim 7 wherein said means for reducing said memory access latency supplies the value from said lower cache level directly to the processor.

11. The cache of claim 8 wherein reducing means supplies the value by gating the address to a plurality of memory array word line drivers of said lower cache level.

* * * * *